(12) United States Patent
Zeng et al.

(10) Patent No.: US 7,440,154 B2
(45) Date of Patent: Oct. 21, 2008

(54) FOURIER TRANSFORM LENS SYSTEM AND HOLOGRAPHIC STORAGE SYSTEM USING SAME

(75) Inventors: Ji-Yong Zeng, Beijing (CN); Guo-Fan Jin, Beijing (CN); Min-Qiang Wang, Beijing (CN); Ying-Bai Yan, Beijing (CN)

(73) Assignees: Tsinghua university, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 262 days.

(21) Appl. No.: 11/414,073

(22) Filed: Apr. 28, 2006

(65) Prior Publication Data

US 2006/0262369 A1 Nov. 23, 2006

(51) Int. Cl.
*G03H 1/16* (2006.01)

(52) U.S. Cl. .......................... 359/29; 259/791
(58) Field of Classification Search ............... None
See application file for complete search history.

(56) References Cited

U.S. PATENT DOCUMENTS 6,349,005 B1 * 2/2002 Schuster et al. ............. 359/754

* cited by examiner

*Primary Examiner*—Stephone B. Allen
*Assistant Examiner*—Derek S Chapel

(57) ABSTRACT

A Fourier transform lens system includes a first lens group having positive power, a second lens group having positive power, and a third lens group having negative power, all arranged on a common optical axis in that sequence. The first lens group includes a first positive meniscus lens, and a negative meniscus lens adjacent to the second lens group. The first positive meniscus lens has a concave lens surface facing toward a concave lens surface of the negative meniscus lens. The second lens group includes at least one bi-convex lens. The third lens group includes a second positive meniscus lens adjacent to the second lens group and a bi-concave lens. The second positive meniscus lens has a convex lens surface facing toward the second lens group. The Fourier transform lens system satisfies the following conditions: (1) $0.8 < f_2/f < 1.4$; (2) $-1.3 < R_{12F}/f < -0.7$; (3) $0.35 < R_{31F}/f < 0.75$; and (4) $0.3 < R_{32R}/f < 0.7$.

19 Claims, 17 Drawing Sheets

FOURIER TRANSFORM LENS SYSTEM AND HOLOGRAPHIC STORAGE SYSTEM USING SAME

BACKGROUND

1. Technical field

This invention relates to a Fourier transform lens system and a holographic storage system using the same, and more particularly to a holographic storage system where a signal beam and a reference beam co-propagate along a common optical axis.

2. Related Art

Among all of modern systems for data storage, holographic storage systems are believed by many to be the most promising due to their higher data storage densities, higher data transfer rates, and shorter access time.

In holographic storage systems, data is stored as holograms that result from the interference of a signal light beam and a reference light beam. Generally speaking, during recording, data can be encoded within the signal light beam by using an object generator, e.g., a spatial light modulator (SLM). Typically, an SLM is a two-dimensional matrix of pixels. Each pixel in the matrix can be directed to transmit or reflect light, which corresponds to the binary digit 1; or to block light, which corresponds to the binary digit 0. Once the signal light beam is encoded by the SLM, it passes through a Fourier transform lens system, and is incident on a holographic storage medium where it intersects with the reference beam to form an interference pattern (i.e., hologram). The interference pattern records the data encoded in the signal light beam to the holographic storage medium. During retrieval, the data recorded in the holographic storage medium is read by illuminating the storage medium with the reference beam. The reference beam diffracts off the stored hologram, generating a reconstructed signal light beam proportional to the original signal light beam used to store the hologram. The reconstructed signal light beam passes through a Fourier transform lens system, and is then typically imaged onto a sensor such as a CCD (charge coupled device) or a CMOS (complementary metal-oxide-semiconductor) active pixel array device. The sensor is attached to a decoder, which is capable of decoding the data contained in the reconstructed signal light beam.

Generally, the above-described recording process and retrieval process can be accomplished by a single integrated holographic storage system or by two separate holographic systems. In the case of two separate holographic systems, one of these is a holographic recording system for data recording, and the other is a holographic retrieval system for data retrieval. The implementation of holographic recording and retrieval techniques in a commercially viable storage system benefits from a simple and robust design of the Fourier transform lens systems. Additionally, various medium types and geometries, e.g., a holographic disk, a holographic tape, or bulk holographic material (e.g., a crystal), have to be supported by such a storage system.

One of proposed approaches for simplifying the optics of a holographic storage system involves combining the signal and reference beams and passing them substantially along a common optical axis through shared optical elements. In this approach, in general, a reference generator (e.g., a light diffuser) is located in a common plane with an object generator for producing a reference beam. The reference beam and signal beam co-propagate along the common optical axis through the shared optical elements, and are incident on a holographic storage medium to write a hologram therein. This configuration increases the clear apertures of the shared optical elements, such as the Fourier transform lens systems. Therefore the Fourier transform lens systems need to be configured appropriately.

What is needed is to provide a Fourier transform lens system and a holographic storage system using the same, wherein a signal beam and a reference beam co-propagate along a common optical axis.

SUMMARY

A preferred embodiment provides a Fourier transform lens system including: a first lens group having positive power, a second lens group having positive power, and a third lens group having negative power arranged on a common optical axis in sequence. The first lens group includes a first positive meniscus lens and a negative meniscus lens adjacent to the second lens group. The first positive meniscus lens has a concave lens surface facing toward a concave lens surface of the negative meniscus lens. The second lens group includes at least one bi-convex lens. The third lens group includes a second positive meniscus lens adjacent to the second lens group and a bi-concave lens, the second positive meniscus lens has a convex lens surface facing toward the second lens group. The Fourier transform lens system satisfies the following conditions (1)~(4):

(1) $0.8 < f_2/f < 1.4$;

(2) $-1.3 < R_{12F}/f < -0.7$;

(3) $0.35 < R_{31F}/f < 0.75$; and (4) $0.3 < R_{32R}/f < 0.7$;

where, f is the total focal length of the Fourier transform lens system, $f_2$ is the focal length of the second lens group, $R_{12F}$ is the radius of curvature of the concave lens surface of the negative meniscus lens, $R_{31F}$ is the radius of curvature of the convex lens surface of the second positive meniscus lens, and $R_{32R}$ is the radius of curvature of a concave lens surface of the bi-concave lens which faces away from the second lens group.

In another preferred embodiment, a holographic storage system includes: an object generator for producing a signal beam; a reference generator for producing a reference beam; a holographic storage medium positioned on an optical axis of the holographic storage system; a sensor; a front group Fourier transform lens system configured for guiding the signal beam and the reference beam along the optical axis to the holographic storage medium to write a hologram; and a rear group Fourier transform lens system having a lens arrangement essentially reverse to that of the front group Fourier transform lens system configured for guiding a reconstructed signal beam produced by the hologram upon illumination with the reference beam to the sensor. Each of the Fourier transform lens systems includes: a first lens group having positive power, a second lens group having positive power, and a third lens group having negative power arranged on the optical axis in that sequence. The first lens group includes a first positive meniscus lens and a negative meniscus lens adjacent to the second lens group, the first positive meniscus lens has a concave lens surface facing toward a concave lens surface of the negative meniscus lens. The second lens group includes at least one bi-convex lens. The third lens group includes a second positive meniscus lens adjacent to the second lens group and a bi-concave negative lens, and the second positive meniscus lens has a convex lens surface facing toward the second lens group. The Fourier transform lens system satisfies the above-described conditions (1)~(4).

Compared with conventional Fourier transform lens systems, the Fourier transform lens system in accordance with the preferred embodiment is an effective lens system suitable for a holographic storage system, wherein a signal beam and a reference beam co-propagate along a common optical axis. In addition, a holographic storage system using the Fourier transform lens systems can have a compact configuration and provide higher quality imaging.

Other advantages and novel features will become more apparent from the following detailed description of various embodiments when taken in conjunction with the accompanying drawings.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present Fourier transform lens system and holographic storage system using the same. Moreover, in the drawings, like reference numerals designate corresponding pales throughout the several views.

Figure 1:
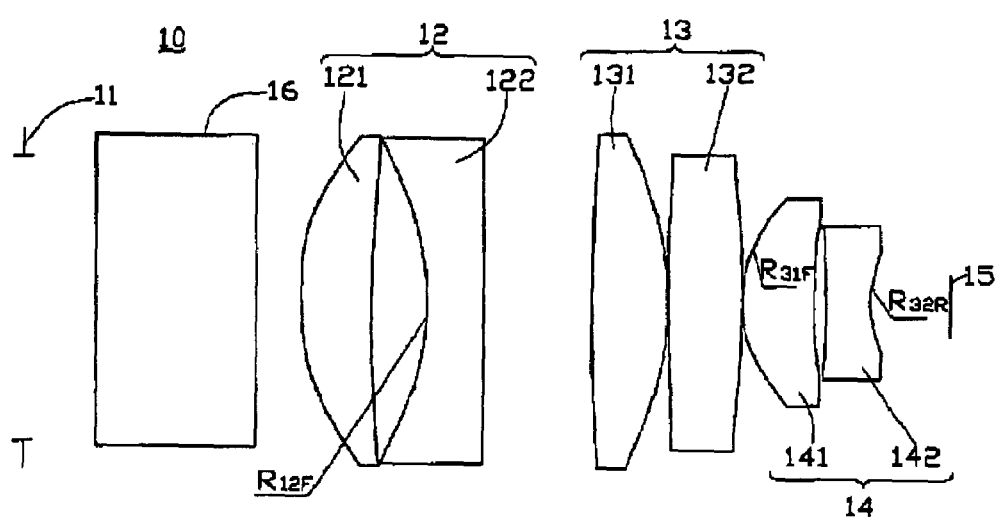
FIG. 1 is a schematic, cross-sectional view of a lens arrangement of a Fourier transform lens system in accordance with a first embodiment of the present invention.
Figure 2:
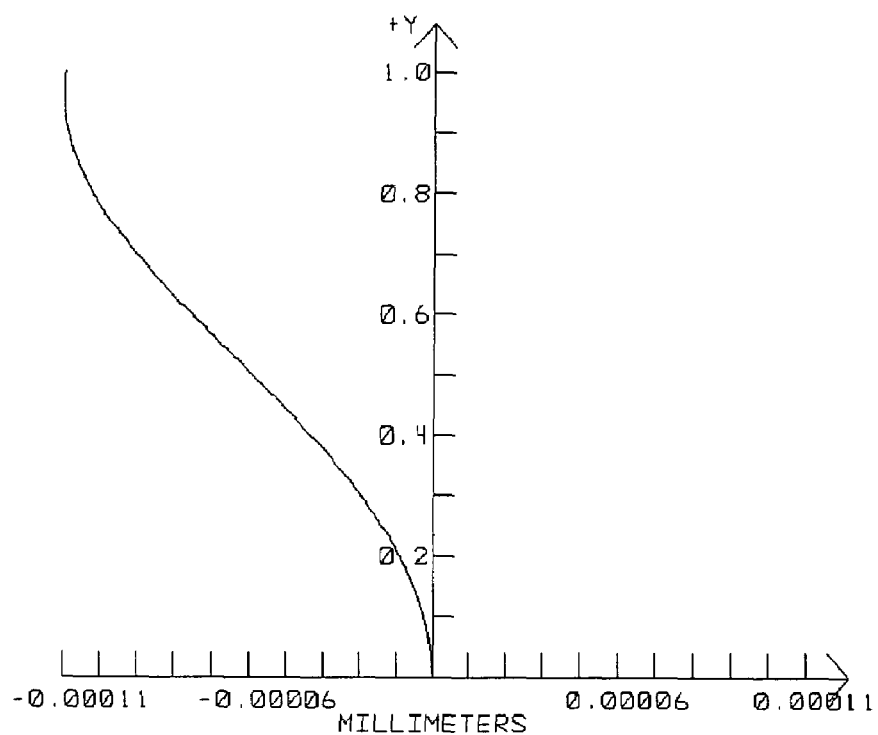
FIG. 2 is a graph showing sine aberrations occurring in a positive optical path of the Fourier transform lens system shown in FIG. 1.

The exemplifications set out herein illustrate various preferred embodiments, in various forms, and such exemplifications are not to be construed as limiting the scope of the present Fourier transform lens system and holographic storage system using the same in any manner.

DETAILED DESCRIPTION OF THE EMBODIMENTS

Various embodiments of a Fourier transform lens system will be described below in detail with reference to FIGS. 1-36. The Fourier transform lens system in accordance with each of the below embodiments has a lens arrangement along a common axis in the following order from an object side to an image side: a first lens group having positive refracting power, a second lens group having positive refracting power, and a third lens group having negative refracting power. In the following description, references to positive power include positive refracting power, and references to negative power include negative refracting power. The first lens group includes a first positive meniscus lens having a convex lens surface facing toward the object side, and a negative meniscus lens having a convex lens surface facing toward the image side. The first positive meniscus lens has a concave lens surface facing toward a concave lens surface of the negative meniscus lens. The second lens group includes at least one bi-convex lens. The third lens group includes the following in order from the object side to the image side: a second positive meniscus lens having a convex lens surface facing toward the object side, and a bi-concave lens having negative power. It is to be understood that the present Fourier transform lens system is not limited to these embodiments. The following are symbols used in each exemplary embodiment, unless the context indicates otherwise:

f: total focal length of the Fourier transform lens system
$f_2$: focal length of the second lens group
F/#: F-number
$2\omega$: field of view
NA: numerical aperture
$R_{12F}$: radius of curvature of the concave lens surface of the negative meniscus lens of the first lens group
$R_{31F}$: radius of curvature of the convex lens surface of the second positive meniscus lens of the third lens group $R_{32R}$: radius of curvature of a concave lens surface of the bi-concave lens of the third lens group, the concave lens surface facing toward the image side $n_{20}$: refractive index of a material of the second lens group $n_{12}$: refractive index of a material of the negative meniscus lens of the first lens group The Fourier transform lens system satisfies the following conditions (1)~(4):

(1) $0.8 < f_2/f < 1.4$;

(2) $-1.3 < R_{12F}/f < -0.7$;

(3) $0.35 < R_{31F}/f < 0.75$; and (4) $0.3 < R_{32R}/f < 0.7$.

Under the conditions (1)~(4), the Fourier transform lens system has very reasonable power allocations, and aberrations occurring in both a positive optical path (namely, an optical path along the direction from the object side to the image side) and a reverse optical path (namely, an optical path along the direction from the image side to the object side) thereof are well corrected. The positive optical path lens arrangement of the Fourier transform lens system can have a relatively large aperture and a small field of view. The reverse optical path lens arrangement of the Fourier transform lens system can have a small aperture and a medium field of view.

When the ratio $f_2/f$ is above the upper limit of 1.4, apositive power value of the second lens group is unduly small, and it is difficult for off-axis aberrations occurring in the reverse optical path to be corrected. On the other hand, when the ratio $f_2/f$ is below the lower limit of 0.8, a positive power value of the second lens group is unduly large, and it is difficult for spherical and sine aberrations occurring in the positive optical path to be corrected.

When the ratio $R_{12F}/f$ is above the upper limit of −0.7, spherical and sine aberrations occurring in the positive optical path are excessively increased along a positive direction in a reference system, and field curvatures occurring in the reverse optical path are excessively increased along a negative direction in the reference system. On the other hand, when the ratio $R_{12F}/f$ is below the lower limit of −1.3, spherical and sine aberrations occurring in the positive optical path are excessively increased along the negative direction, and field curvatures occurring in the reverse optical path are excessively increased along the positive direction.

When the ratio $R_{31F}/f$ is above the upper limit of 0.75, spherical and sine aberrations occurring in the positive optical path are excessively increased along the positive direction, and spherical and sine aberrations occurring in the reverse optical path are excessively increased along the negative direction. Further, field curvatures occurring in both the positive optical path and reverse optical path are excessively increased along the positive direction. On the other hand, when the ratio $R_{31F}/f$ is below the lower limit of 0.35, spherical and sine aberrations occurring in the positive optical path are excessively increased along the negative direction, and spherical and sine aberrations occurring in the reverse optical path are excessively increased along the positive direction. Further, field curvatures occurring in both the positive optical path and reverse optical path are excessively increased along the negative direction.

When the ratio $R_{32R}/f$ is above the upper limit of 0.7, spherical and sine aberrations occurring in the positive optical path are excessively increased along the positive direction, spherical aberrations and sine aberrations occurring in the reverse optical path are excessively increased along the positive direction and negative direction respectively, and field curvatures occurring in both the positive optical path and reverse optical path are excessively increased along the positive direction. On the other hand, when the ratio $R_{32R}/f$ is below the lower limit of 0.3, spherical and sine aberrations occurring in the positive optical path are excessively increased along the negative direction, spherical aberrations and sine aberrations occurring in the reverse optical path are excessively increased along the negative direction and positive direction respectively, and field curvatures occurring in both the positive optical path and reverse optical path are excessively increased along the negative direction.

Preferably, the Fourier transform lens system further satisfies the following conditions (5)~(6):

(5) $n_{20} > 1.7$, and (6) $n_{20} - n_{12} > 0.13$.

Under the conditions (5)~(6), the Fourier transform lens system has further improved optical properties. When $n_{20}$ is below the lower limit of 1.7, and when $(n_{20} - n_{12})$ is below the lower limit of 0.13, the field curvatures occurring in the reverse optical path may be diminished.

Embodiment 1

Referring to FIG. 1, a Fourier transform lens system 10 in accordance with the first embodiment has a lens arrangement along an optical axis (not shown). The lens arrangement includes, in order from an object side to an image side 15: a first lens group 12 having positive power, a second lens group 13 having positive power, and a third lens group 14 having negative power. If necessary, in order to reduce or eliminate any effect of stray light and achieve high quality imaging, an aperture stop 11 can be disposed at the object side. When the lens arrangement of the Fourier transform lens system 10 is used for a front group Fourier transform lens system of a holographic storage system, usually a beam splitter 16 is disposed at the object side near the aperture stop 11. The first lens group 12 includes a first positive meniscus lens 121 having positive power, and a negative meniscus lens 122 having negative power. The first positive meniscus lens 121 has a convex lens surface facing toward the object side, and a concave lens surface facing toward the image side 15. The negative meniscus lens 122 has a convex lens surface facing toward the image side 15, and a concave lens surface facing toward the object side. The concave lens surface of the first positive meniscus lens 121 faces toward the concave lens surface of the negative meniscus lens 122. The second lens group 13 includes two bi-convex lenses 131, 132 each having positive power. The third lens group 14 includes a second positive meniscus lens 141 having positive power, and a bi-concave lens 142 having negative power. The second positive meniscus lens 141 has a convex lens surface facing toward the object side.

Referring to Table 1 below, structural parameters of the Fourier transform lens system 10 are listed. In the table, $R_i$ is a radius of curvature of an i-th surface starting from the aperture stop 11, $d_i$ is a distance between adjacent surfaces starting from the aperture stop 11, $D_i$ is an aperture size of the i-th surface starting from the aperture stop 11, and $n_i$ is a refractive index of a material of an i-th lens starting from the aperture stop 11 corresponding to light with a wavelength of 0.532 microns.

TABLE 1

| No. | $R_i$ (mm) | $d_i$ (mm) | $n_i$ | $D_i$ (mm) |
|---|---|---|---|---|
| Object | 0 | Infinity | | 0 |
| 1 (Aperture stop) | 0 | 6 | | 35 |
| 2 | 0 | 20 | 1.51947258 | 36.05343 |
| 3 | 0 | 4 | | 38.35935 |
| 4 | 36.33339 | 7.300025 | 1.76430945 | 40.12215 |
| 5 | 259.9779 | 5.965643 | | 39.21057 |
| 6 | −39.43035 | 7.999989 | 1.61644291 | 39.20534 |
| 7 | −3265.623 | 10.84691 | | 40.05598 |
| 8 | 289.9402 | 8 | 1.76430945 | 41.18517 |
| 9 | −48.15284 | 0 | | 41.16699 |
| 10 | 484.5187 | 7.4639 | 1.76430945 | 36.71601 |
| 11 | −150.6946 | 0 | | 33.54119 |
| 12 | 19.49241 | 8.000076 | 1.76430945 | 26.03114 |
| 13 | 77.90768 | 1.347398 | | 20.55229 |
| 14 | −133.8419 | 5.07625 | 1.76430945 | 19.06984 |
| 15 | 16.44274 | 6.999786 | | 12.04593 |
| Image | 0 | | | 2.995208 |

It is noted that in the illustrated embodiment: $R_{12F} = R_6 = -39.43035$ mm; $R_{31F} = R_{12} = 19.49241$; $R_{32R} = R_{15} = 16.44274$; $n_{20} = 1.76430945$ (namely, $n_8$ and $n_{10}$ listed in Table 1); and $n_{12} = 1.61644291$ (namely, $n_6$ listed in Table 1).

Referring to Table 5 below, in the illustrated embodiment: f is equal to 33 millimeters (hereinafter referred to as mm); the ratio $f_2/f$ is 1.24; F/# of the positive optical path (namely, an optical path along the direction from the object side to the image side 15) for the object region is 1.7, and 2ω of the positive optical path for the object region is 5.2°; F/# of the reverse optical path (namely, an optical path along the direction from the image side 15 to the object side) for the object region is 11, and 2ω of the reverse optical path for the object region is 33.8°; $R_{12F}/f$ is approximately equal to −1.19; $R_{31F}/f$ is approximately equal to 0.59; $R_{32R}/f$ is approximately equal to 0.50; $n_{20}$ is equal to 1.76430945; and $(n_{20}-n_{12})$ is equal to 0.14786654. Accordingly, the conditions (1)~(6) as described above are satisfied.

Figure 3:
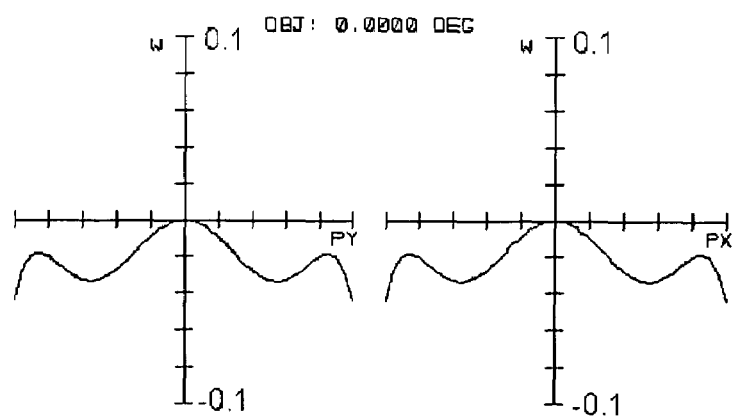
FIGS. 3-5 are graphs respectively showing optical path differences occurring in the positive optical path of the Fourier transform lens system shown in FIG. 1.
Figure 4:
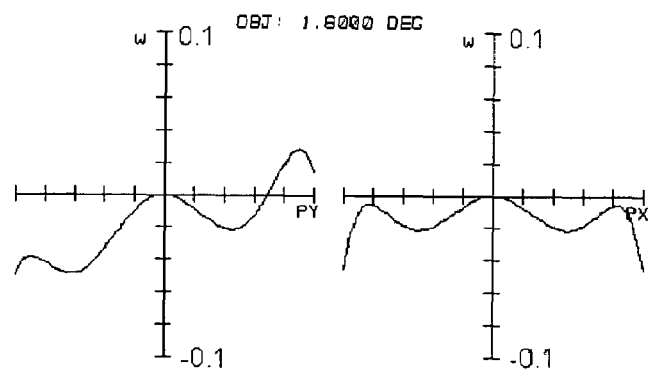
Figure 5:
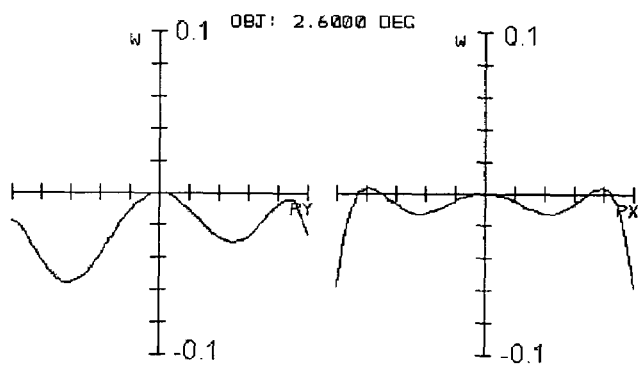
Figure 6:
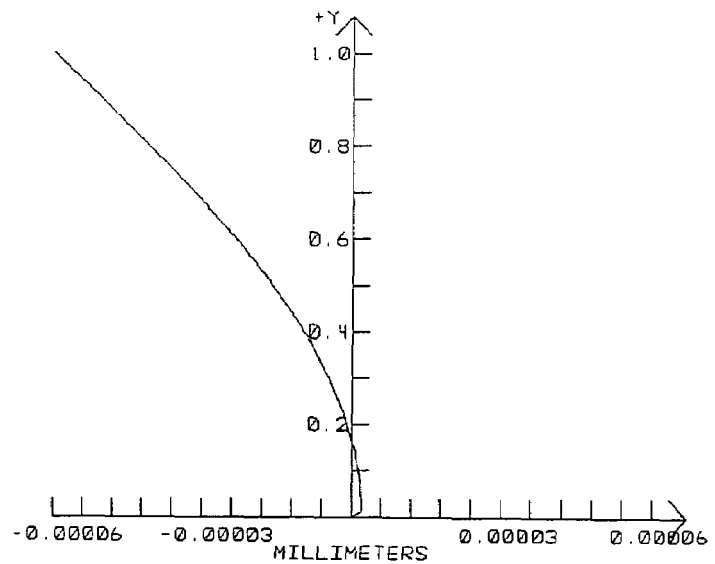
FIG. 6 is a graph showing sine aberrations occurring in a reverse optical path of the Fourier transform lens system shown in FIG. 1.
Figure 7:
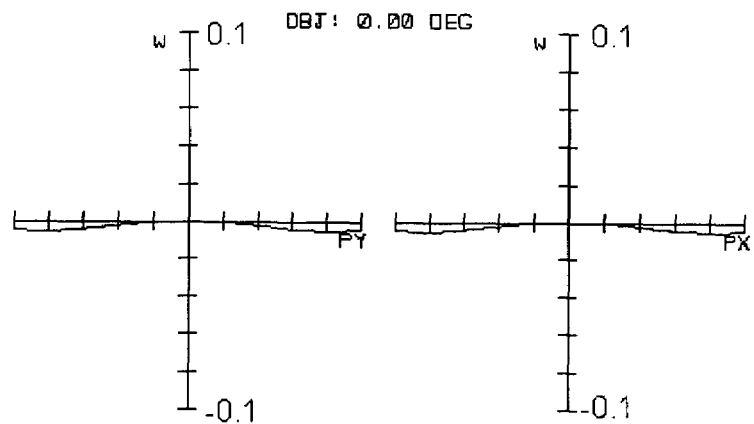
FIGS. 7-9 are graphs respectively showing optical path differences occurring in the reverse optical path of the Fourier transform lens system shown in FIG. 1.
Figure 8:
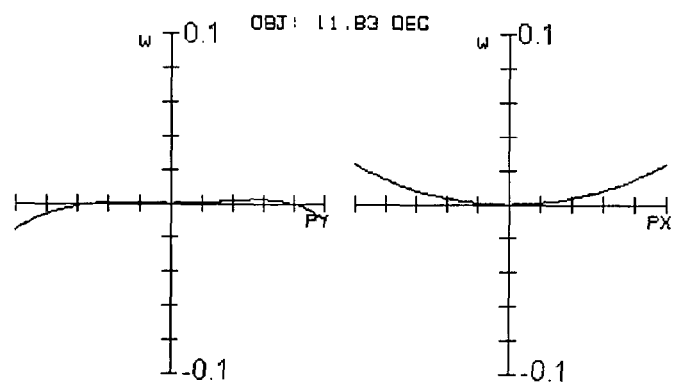
Figure 9:
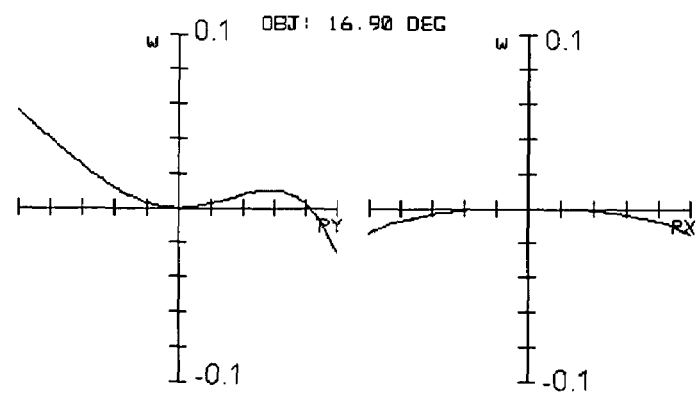

Referring to FIGS. 2-9, FIG. 2 and FIG. 6 are graphs respectively showing sine aberrations occurring in the positive optical path and the reverse optical path. FIGS. 3-5 are graphs respectively showing optical path differences occurring in the positive optical path. FIGS. 7-9 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 10 along the optical axis direction thereof satisfy the sine condition (namely, a paraxial condition of ideal image height fsin ω)); and that optical path differences occurring in both the positive optical path and reverse optical path are very small under conditions (1)~(6), such that the Fourier transform lens system 10 achieves diffractive-limit. Accordingly, the positive optical path lens arrangement of the Fourier transform lens system 10 has a relatively large aperture and a small field of view, and the reverse optical path lens arrangement of the Fourier transform lens system 10 has a small aperture and a medium field of view. Thereby, the Fourier transform lens system 10 is advantageously suitable for use in a holographic storage system where a signal beam and a reference beam co-propagate along a common optical axis.

Embodiment 2

Figure 10:
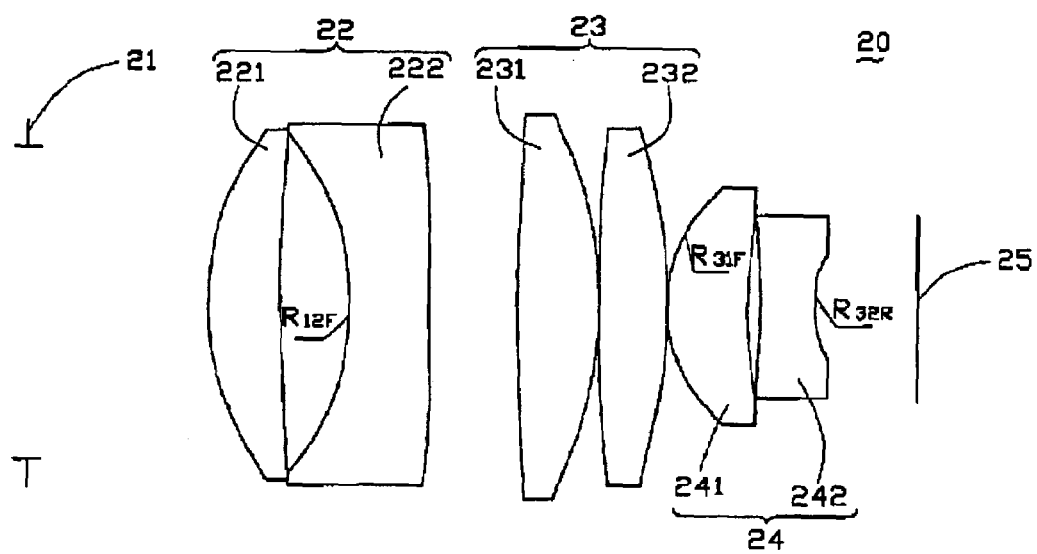
FIG. 10 is a schematic, cross-sectional view of a lens arrangement of a Fourier transform lens system in accordance with a second embodiment of the present invention.
Figure 11:
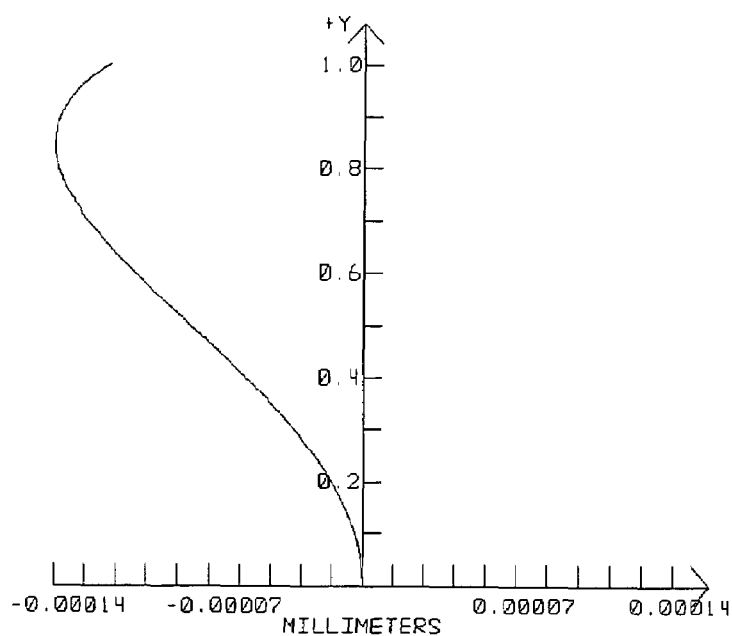
FIG. 11 is a graph showing sine aberrations occurring in a positive optical path of the Fourier transform lens system shown in FIG. 10.

Referring to FIG. 10, a Fourier transform lens system 20 in accordance with the second embodiment has a lens arrangement along an optical axis (not shown). The lens arrangement includes, in order from an object side to an image side 25: a first lens group 22 having positive power, a second lens group 23 having positive power, and a third lens group 24 having negative power. If necessary, in order to reduce or eliminate any effect of stray light and achieve high quality imaging, an aperture stop 21 can be disposed at the object side. The first lens group 22 includes a first positive meniscus lens 221 having positive power, and a negative meniscus lens 222 having negative power. The first positive meniscus lens 221 has a convex lens surface facing toward the object side, and a concave lens surface facing toward the image side 25. The negative meniscus lens 222 has a convex lens surface facing toward the image side 25, and a concave lens surface facing toward the object side. The concave lens surface of the first positive meniscus lens 221 faces toward the concave lens surface of the negative meniscus lens 222. The second lens group 23 includes two bi-convex lenses 231, 232 each having positive power. The third lens group 24 includes a second positive meniscus lens 241 having positive power, and a bi-concave lens 242 having negative power. The second positive meniscus lens 241 has a convex lens surface facing toward the object side.

Referring to Table 2 below, structural parameters of the Fourier transform lens system 20 are listed. In the table, $R_i$ is a radius of curvature of an i-th surface starting from the aperture stop 21, $d_i$ is a distance between adjacent surfaces starting from the aperture stop 21, $D_i$ is an aperture size of the i-th surface starting from the aperture stop 21, and $n_i$ is a refractive index of a material of an i-th lens starting from the aperture stop 21 corresponding to light with a wavelength of 0.532 microns.

TABLE 2

| No. | $R_i$ (mm) | $d_i$ (mm) | $n_i$ | $D_i$ (mm) |
|---|---|---|---|---|
| Object | 0 | Infinity | | 0 |
| 1 (Aperture stop) | 0 | 17.99984 | | 35 |
| 2 | 35.92173 | 6.99152 | 1.76430945 | 39.17968 |
| 3 | 223.8108 | 6.987351 | | 38.28602 |
| 4 | −32.79306 | 8.000004 | 1.61644291 | 38.28614 |
| 5 | −342.4059 | 8.170681 | | 40.92897 |
| 6 | 413.1165 | 8 | 1.76430945 | 43.18773 |
| 7 | −54.99058 | 0 | | 43.45536 |
| 8 | 196.3686 | 7.836986 | 1.76430945 | 40.44054 |
| 9 | −71.50008 | 0 | | 38.81267 |
| 10 | 19.54368 | 7.907338 | 1.76430945 | 26.68337 |
| 11 | 76.89249 | 1.092668 | | 21.06365 |
| 12 | −182.7436 | 5.484851 | 1.76430945 | 20.33431 |
| 13 | 14.95787 | 6.399578 | | 11.98142 |
| Image | 0 | | | 2.996645 |

It is noted that in the illustrated embodiment: $R_{12F} = R_4 = -32.79306$ mm; $R_{31F} = R_{10} = 19.54368$ mm; $R_{32R} = R_{13} = 14.95787$ mm; $n_{20} = 1.76430945$ (namely, $n_6$ and $n_8$ listed in Table 2); and $n_{12} = 1.61644291$ (namely, $n_4$ listed in Table 2).

Referring to Table 5 below, in the illustrated embodiment: f is equal to 30 mm; the ratio $f_2/f$ is 1.14; F/# of the positive optical path (namely, an optical path along the direction from the object side to the image side 25) for the object region is 1.67, and 2ω of the positive optical path for the object region is 5.72°; F/# of the reverse optical path (namely, an optical path along the direction from the image side 25 to the object side) for the object region is 10, and 2ω of the reverse optical path for the object region is 34°; $R_{12F}/f$ is approximately equal to −1.09; $R_{31F}/f$ is approximately equal to 0.65; $R_{32R}/f$ is approximately equal to 0.50; $n_{20}$ is equal to 1.76430945; and $(n_{20}-n_{12})$ is equal to 0.14786654. Accordingly, the conditions (1)~(6) as described above are satisfied.

Figure 12:
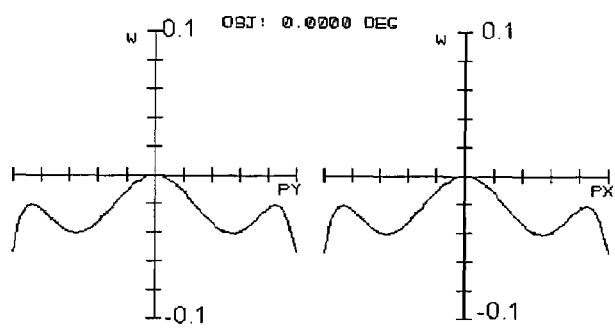
FIGS. 12-14 are graphs respectively showing optical path differences occurring in the positive optical path of the Fourier transform lens system shown in FIG. 10.
Figure 13:
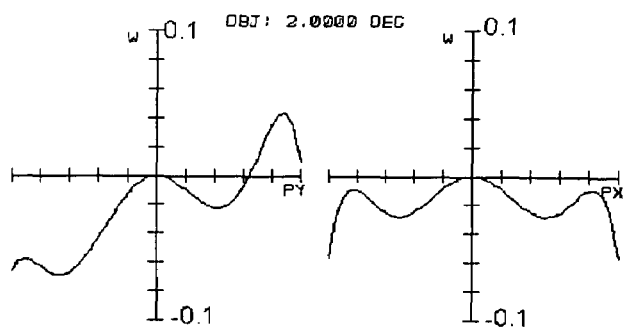
Figure 14:
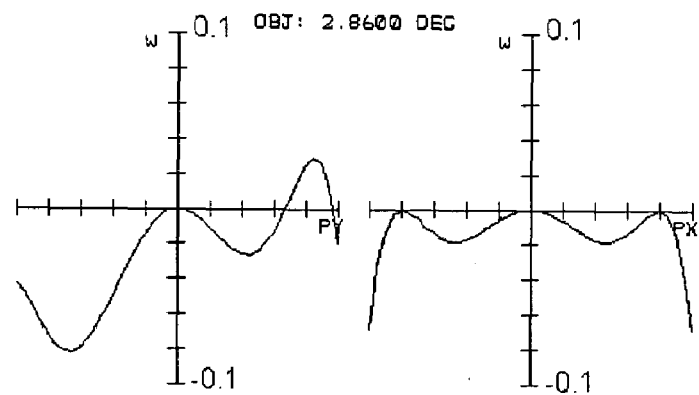
Figure 15:
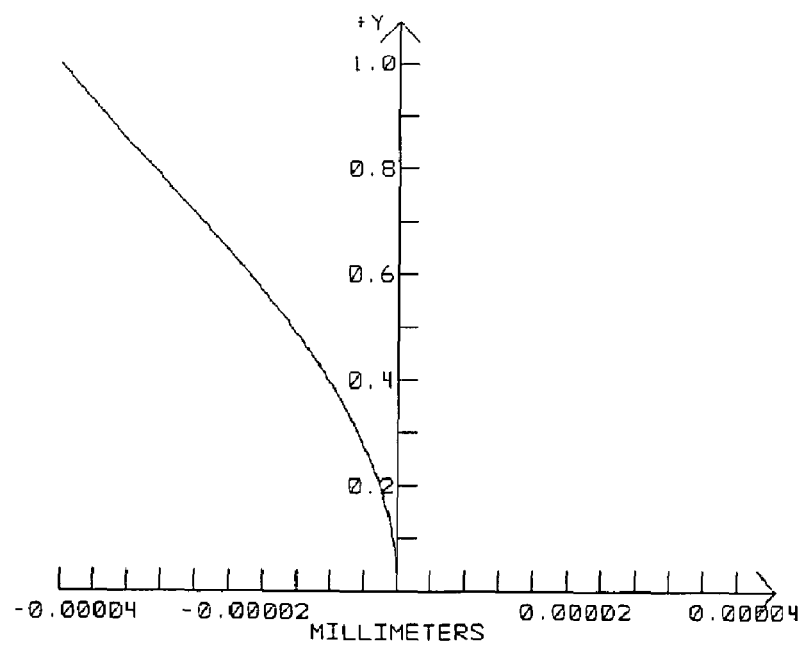
FIG. 15 is a graph showing sine aberrations occurring in a reverse optical path of the Fourier transform lens system shown in FIG. 10.
Figure 16:
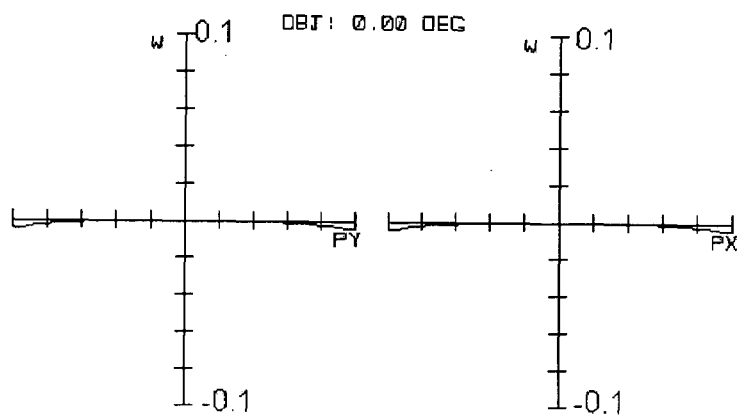
FIGS. 16-18 are graphs respectively showing optical path differences occurring in the reverse optical path of the Fourier transform lens system shown in FIG. 10.
Figure 17:
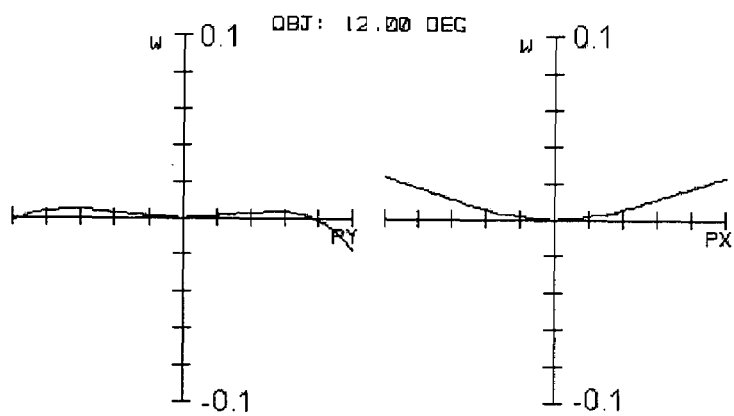
Figure 18:
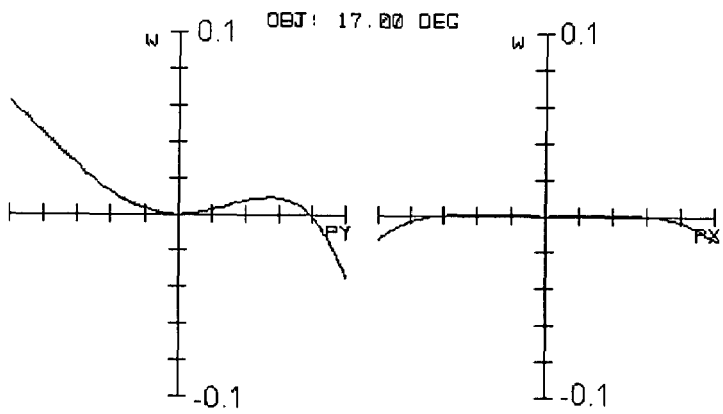

Referring to FIGS. 11-18, FIG. 11 and FIG. 15 are graphs respectively showing sine aberrations occurring in the positive optical path and the reverse optical path. FIGS. 12-14 are graphs respectively showing optical path differences occurring in the positive optical path. FIGS. 16-18 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 20 along the optical axis direction thereof satisfy the sine condition; and that optical path differences occurred in both the positive optical path and reverse optical path are very small under conditions (1)~(6), such that the Fourier transform lens system 20 achieves diffractive-limit. Accordingly, the positive optical path lens arrangement of the Fourier transform lens system 20 has a relatively large aperture and a small field of view, and the reverse optical path lens arrangement of the Fourier transform lens system 20 has a small aperture and a medium field of view. Thereby, the Fourier transform lens system 20 is advantageously suitable for use in a holographic storage system where a signal beam and a reference beam co-propagate along a common optical axis.

Embodiment 3

Figure 19:
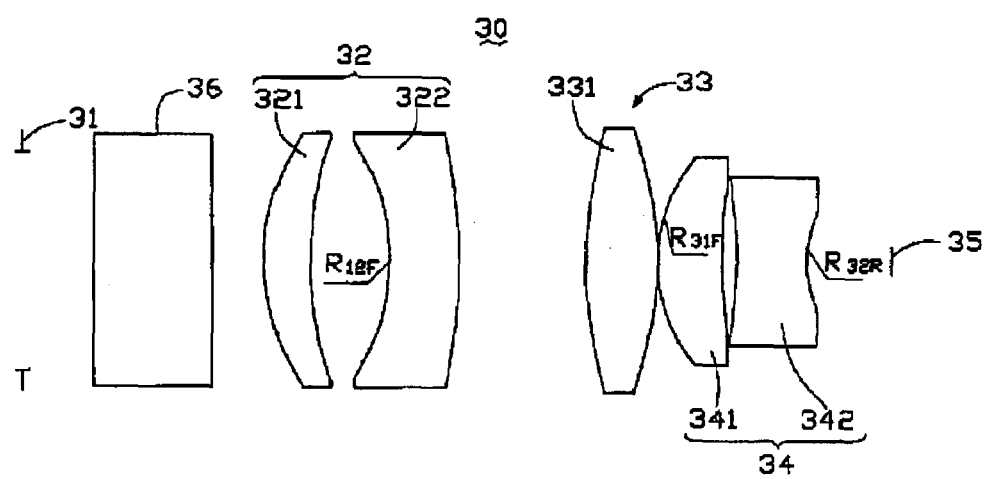
FIG. 19 is a schematic, cross-sectional view of a lens arrangement of a Fourier transform lens system in accordance with a third embodiment of the present invention.
Figure 20:
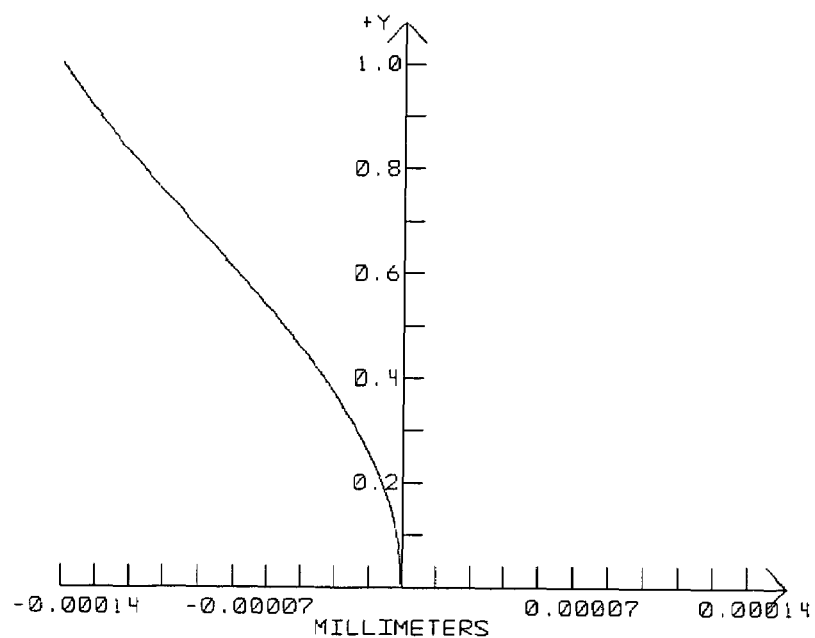
FIG. 20 is a graph showing sine aberrations occurring in a positive optical path of the Fourier transform lens system shown in FIG. 19.

Referring to FIG. 19, a Fourier transform lens system 30 in accordance with the third embodiment has a lens arrangement along an optical axis (not shown). The lens arrangement includes, in order from an object side to an image side 35: a first lens group 32 having positive power, a second lens group 33 having positive power, and a third lens group 34 having negative power. If necessary, in order to reduce or eliminate any effect of stray light and achieve high quality imaging, an aperture stop 31 can be disposed at the object side. When the lens arrangement of the Fourier transform lens system 30 is used for a front group Fourier transform lens system of a holographic storage system, usually a beam splitter 36 is disposed at the object side near to the aperture stop 31. The first lens group 32 includes a first positive meniscus lens 321 having positive power, and a negative meniscus lens 322 having negative power. The first positive meniscus lens 321 has a convex lens surface facing toward the object side, and a concave lens surface facing toward the image side 35. The negative meniscus lens 322 has a convex lens surface facing toward the image side 35, and a concave lens surface facing toward the object side. The concave lens surface of the first positive meniscus lens 321 faces toward the concave lens surface of the negative meniscus lens 322. The second lens group 33 includes a bi-convex lens 331 having positive power. The third lens group 34 includes a second positive meniscus lens 341 having positive power, and a bi-concave lens 342 having negative power. The second positive meniscus lens 341 has a convex lens surface facing toward the object side.

Referring to Table 3 below, structural parameters of the Fourier transform lens system 30 are listed. In the table, $R_i$ is a radius of curvature of an i-th surface starting from the aperture stop 31, $d_i$ is a distance between adjacent surfaces starting from the aperture stop 31, $D_i$ is an aperture size of the i-th surface starting from the aperture stop 31, and $n_i$ is a refractive index of a material of an i-th lens starting from the aperture stop 31 corresponding to light with a wavelength of 0.532 microns.

TABLE 3

| No. | $R_i$ (mm) | $d_i$ (mm) | $n_i$ | $D_i$ (mm) |
|---|---|---|---|---|
| Object | 0 | Infinity | | 0 |
| 1 (Aperture stop) | 0 | 7 | | 35 |
| 2 | 0 | 20 | 1.51947258 | 36.22913 |
| 3 | 0 | 7 | | 38.53529 |
| 4 | 39.6495 | 6.56846 | 1.76430945 | 40.7542 |
| 5 | 74.30292 | 10.94123 | | 39.29962 |
| 6 | −39.69628 | 10 | 1.51904165 | 38.28509 |
| 7 | −105.8815 | 18 | | 40.67637 |
| 8 | 81.68932 | 10 | 1.76430945 | 42.46295 |
| 9 | −67.32571 | 0.01725895 | | 41.73609 |
| 10 | 28.112 | 9.209013 | 1.76430945 | 33.06897 |
| 11 | 142.7267 | 1.841825 | | 27.73369 |
| 12 | −107.6848 | 9.973364 | 1.76430945 | 26.83621 |
| 13 | 22.83241 | 11.99998 | | 16.55415 |
| Image | 0 | | | 3.993728 |

It is noted that in the illustrated embodiment: $R_{12F} = R_6 = -39.69628$ mm; $R_{31F} = R_{10} = 28.112$ mm; $R_{32R} = R_{13} = 22.83241$ mm; $n_{20} = 1.76430945$ (namely, $n_8$ listed in Table 3); and $n_{12} = 1.51904165$ (namely, $n_6$ listed in Table 3).

Referring to Table 5 below, in the illustrated embodiment: f is equal to 44 mm; the ratio $f_2/f$ is 1.11; F/# of the positive optical path (namely, an optical path along the direction from the object side to image side 35) for the object region is 2.2, and 2 ω of the positive optical path for the object region is 5.2°; F/# of the reverse optical path (namely, an optical path along the direction from the image side 35 to the object side) for the object region is 11, and 2ω of the reverse optical path for object region is 25.6°; $R_{12F}/f$ is approximately equal to −0.90; $R_{31F}/f$ is approximately equal to 0.64; $R_{32R}/f$ is approximately equal to 0.52; $n_{20}$ is equal to 1.76430945; and $(n_{20}-n_{12})$ is equal to 0.24526780. Accordingly, the conditions (1)~(6) as described above are satisfied.

Figure 21:
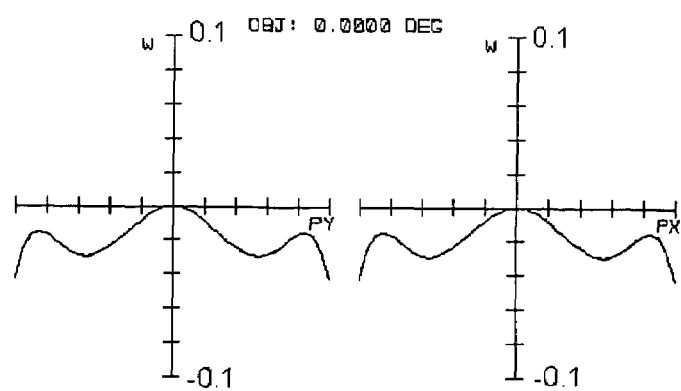
FIGS. 21-23 are graphs respectively showing optical path differences occurring in the positive optical path of the Fourier transform lens system shown in FIG. 19.
Figure 22:
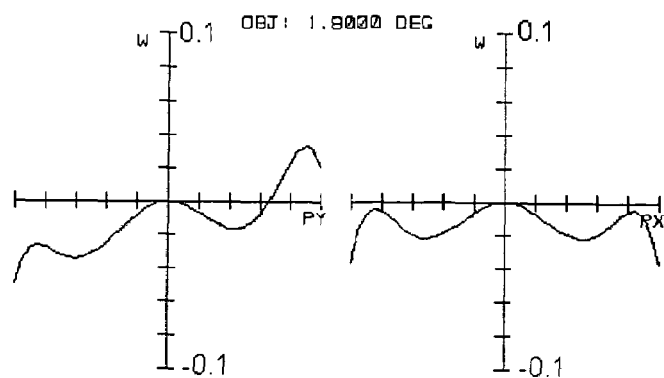
Figure 23:
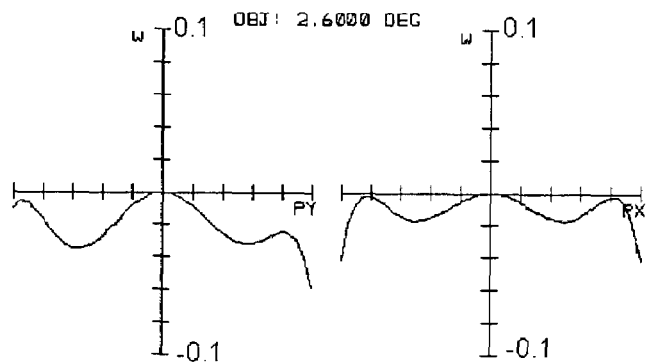
Figure 24:
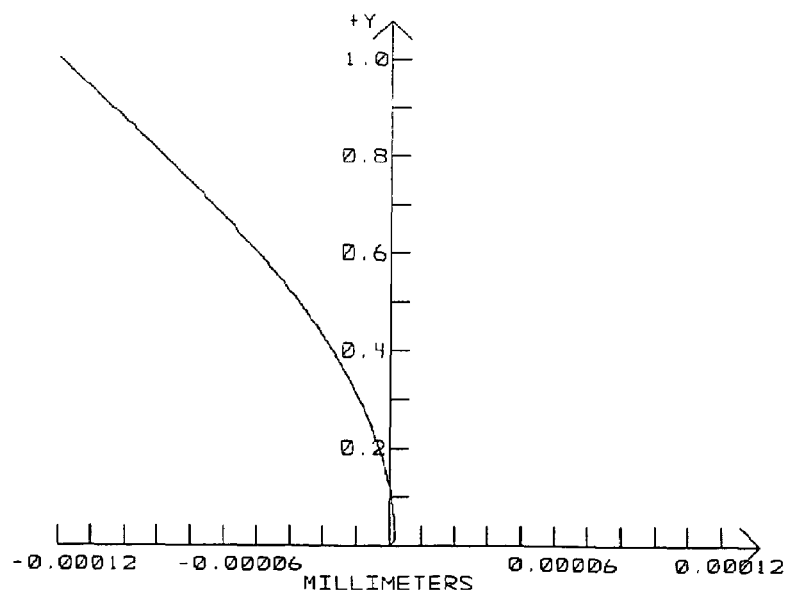
FIG. 24 is a graph showing sine aberrations occurring in a reverse optical path of the Fourier transform lens system shown in FIG. 19.
Figure 25:
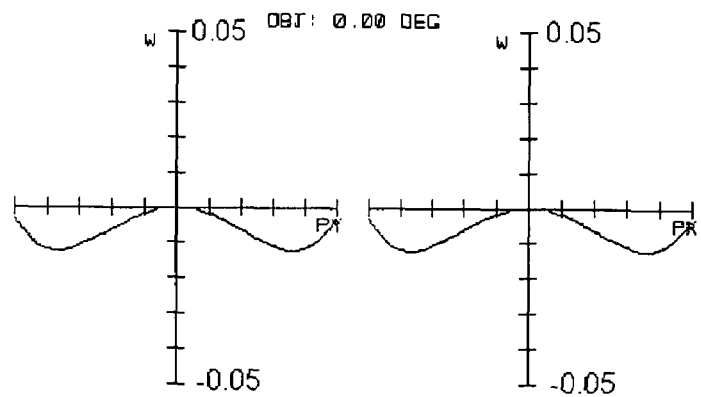
FIGS. 25-27 are graphs respectively showing optical path differences occurring in the reverse optical path of the Fourier transform lens system shown in FIG. 19.
Figure 26:
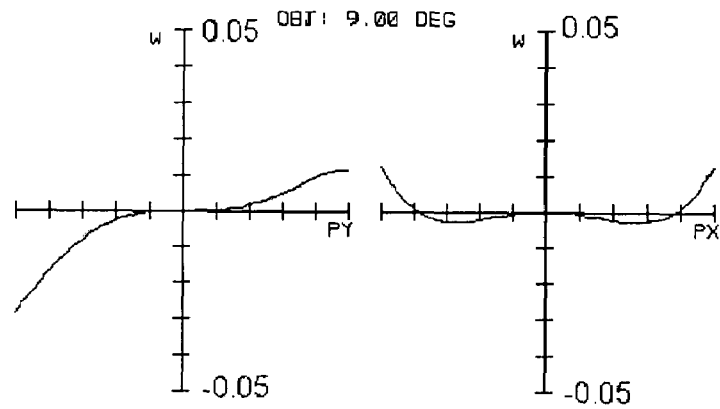
Figure 27:
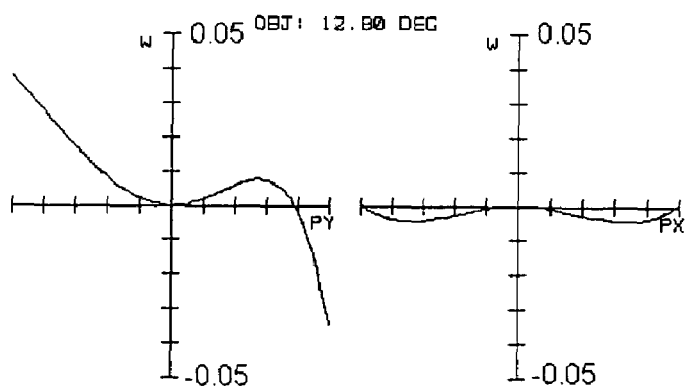

Referring to FIGS. 20-27, FIG. 20 and FIG. 24 are graphs respectively showing sine aberrations occurring in the positive optical path and the reverse optical path. FIGS. 21-23 are graphs respectively showing optical path differences occurring in the positive optical path. FIGS. 25-27 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 30 along the optical axis direction thereof satisfy the sine condition; and that optical path differences occurring in both the positive optical path and reverse optical path are very small under conditions (1)~(6), such that the Fourier transform lens system 30 achieves diffractive-limit. Accordingly, the positive optical path lens arrangement of the Fourier transform lens system 30 has a relatively large aperture and a small field of view, and the reverse optical path lens arrangement of the Fourier transform lens system 30 has a small aperture and a medium field of view. Thereby, the Fourier transform lens system 30 is advantageously suitable for use in a holographic storage system where a signal beam and a reference beam co-propagate along a common optical axis.

Embodiment 4

Figure 28:
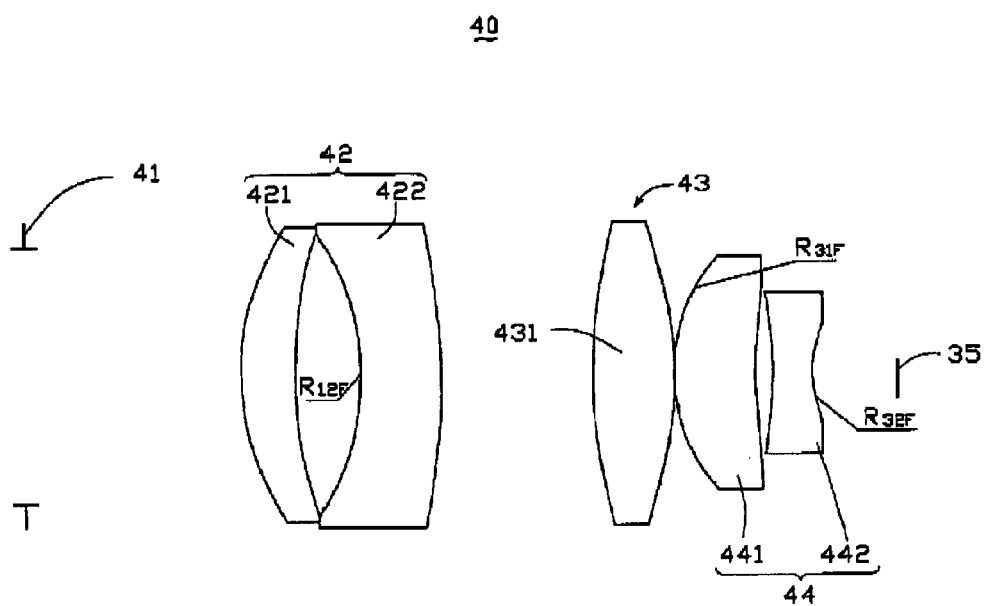
FIG. 28 is a schematic, cross-sectional view of a lens arrangement of a Fourier transform lens system in accordance with a fourth embodiment of the present invention.
Figure 29:
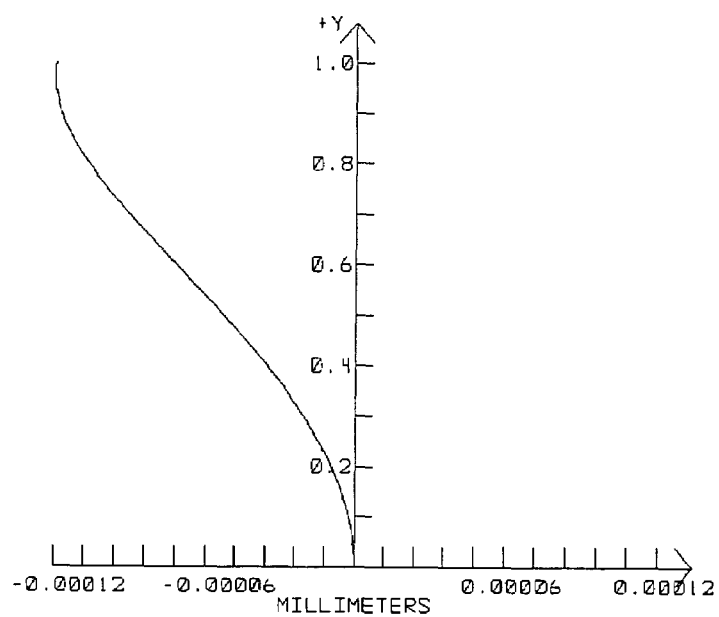
FIG. 29 is a graph showing sine aberrations occurring in a positive optical path of the Fourier transform lens system shown in FIG. 28.

Referring to FIG. 28, a Fourier transform lens system 40 in accordance with the fourth embodiment has a lens arrangement along an optical axis (not shown). The lens arrangement includes, in order from an object side to an image side 45: a first lens group 42 having positive power, a second lens group 43 having positive power, and a third lens group 44 having negative power. If necessary, in order to reduce or eliminate any effect of stray light and achieve high quality imaging, an aperture stop 41 can be disposed at the object side. The first lens group 42 includes a first positive meniscus lens 421 having positive power, and a negative meniscus lens 422 having negative power. The first positive meniscus lens 421 has a convex lens surface facing toward the object side, and a concave lens surface facing toward the image side 45. The negative meniscus lens 422 has a convex lens surface facing toward the image side 45, and a concave lens surface facing toward the object side. The concave lens surface of the first positive meniscus lens 421 faces toward the concave lens surface of the negative meniscus lens 422. The second lens group 43 includes a bi-convex lens 431 having positive power. The third lens group 44 includes a second positive meniscus lens 441 having positive power, and a bi-concave lens 442 having negative power. The second positive meniscus lens 441 has a convex lens surface facing toward the object side.

Referring to Table 4 below, structural parameters of the Fourier transform lens system 40 are listed. In the table, $R_i$ is a radius of curvature of an i-th surface starting from the aperture stop 41, $d_i$ is a distance between adjacent surfaces starting from the aperture stop 41, $D_i$ is an aperture size of the i-th surface starting from the aperture stop 41, and $n_i$ is a refractive index of a material of an i-th lens starting from the aperture stop 41 corresponding to light with a wavelength of 0.532 microns.

TABLE 4

| No. | $R_i$ (mm) | $d_i$ (mm) | $n_i$ | $D_i$ (mm) |
|---|---|---|---|---|
| Object | 0 | Infinity | | 0 |
| 1 (Aperture stop) | 0 | 26 | | 35 |
| 2 | 37.73878 | 6.356008 | 1.76430945 | 40.60571 |
| 3 | 76.36444 | 8.13851 | | 39.29404 |
| 4 | −37.44756 | 10 | 1.51904165 | 39.29405 |
| 5 | −79.54566 | 17.90278 | | 41.75834 |
| 6 | 59.53494 | 10 | 1.76430945 | 42.07749 |
| 7 | −78.21682 | 0.0209006 | | 41.00025 |
| 8 | 25.33902 | 9.998032 | 1.76430945 | 31.23085 |
| 9 | 105.4741 | 1.870958 | | 24.06542 |
| 10 | −90.79687 | 4.677521 | 1.76430945 | 22.26506 |
| 11 | 20.56254 | 10.90902 | | 15.86942 |
| Image | 0 | | | 3.993963 |

It is noted that in the illustrated embodiment: $R_{12F} = R_4 = -37.44756$ mm; $R_{31F} = R_8 = 25.33902$ mm; $R_{32R} = R_{11} = 20.56254$ mm; $n_{20} = 1.76430945$ (namely, $n_6$ listed in Table 4); and $n_{12} = 1.51904165$ (namely, $n_4$ listed in Table 4).

Referring to Table 5 below, in the illustrated embodiment: f is equal to 40 mm; the ratio $f_2/f$ is 1.04; F/# of the positive optical path (namely, an optical path along the direction from the object side to image side 45) for the object region is 2.25, and 2ω of the positive optical path for the object region is 5.72°; F/# of the reverse optical path (namely, an optical path along the direction from the image side 45 to the object side) for the object region is 10, and 2ω of the reverse optical path for the object region is 26°; $R_{12F}/f$ is approximately equal to −0.94; $R_{31F}/f$ is approximately equal to 0.63; $R_{32R}/f$ is approximately equal to 0.51; $n_{20}$ is equal to 1.76430945; and ($n_{20}-n_{12}$) is equal to 0.24526780. Accordingly, the conditions (1)~(6) as described above are satisfied.

Figure 30:
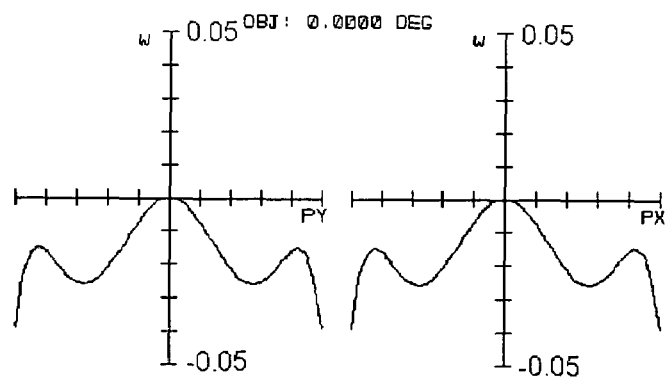
FIGS. 30-32 are graphs respectively showing optical path differences occurring in the positive optical path of the Fourier transform lens system shown in FIG. 28.
Figure 31:
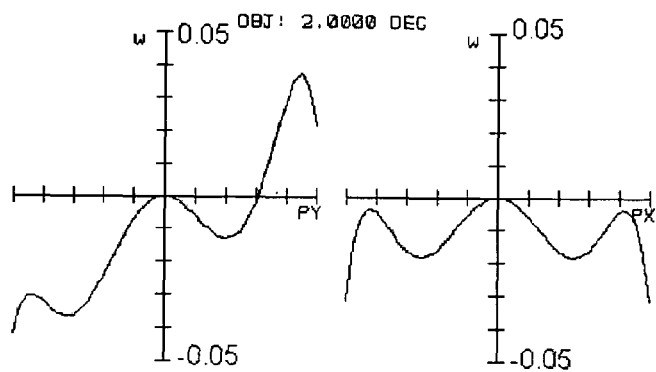
Figure 32:
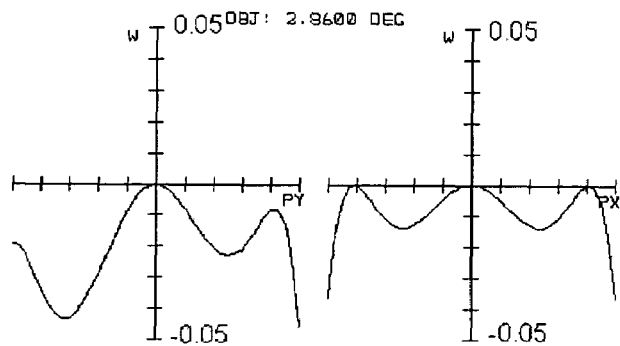
Figure 33:
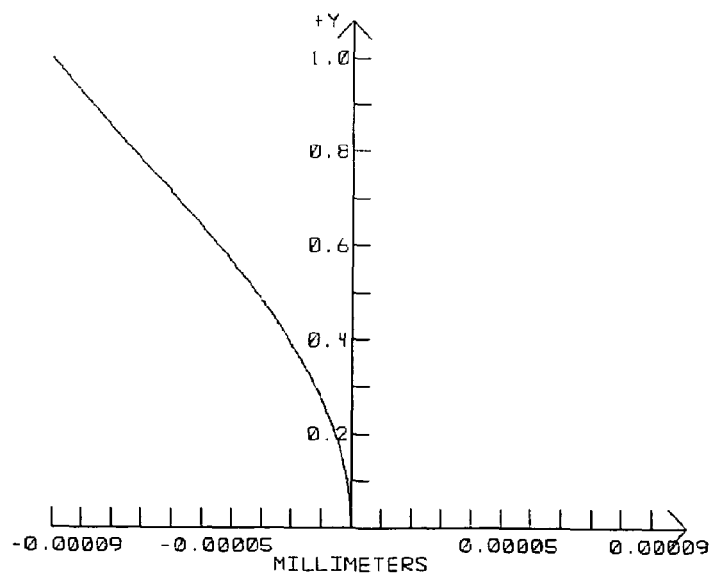
FIG. 33 is a graph showing sine aberrations occurring in a reverse optical path of the Fourier transform lens system shown in FIG. 28.
Figure 34:
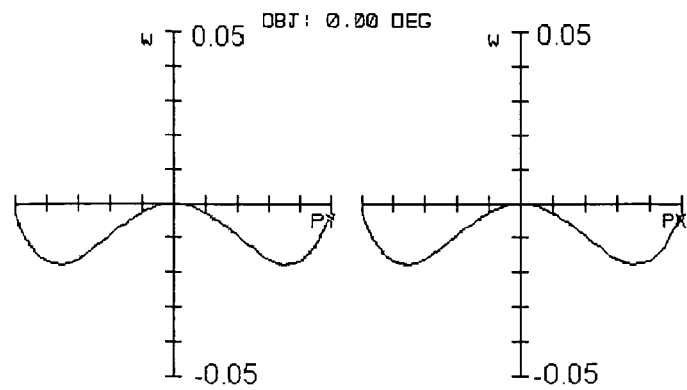
FIGS. 34-36 are graphs respectively showing optical path differences occurring in the reverse optical path of the Fourier transform lens system shown in FIG. 28.
Figure 35:
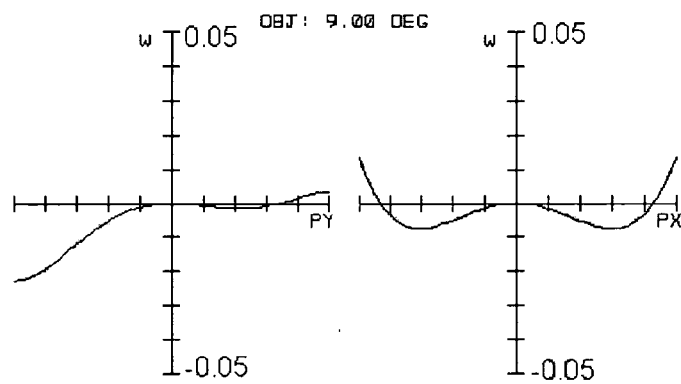
Figure 36:
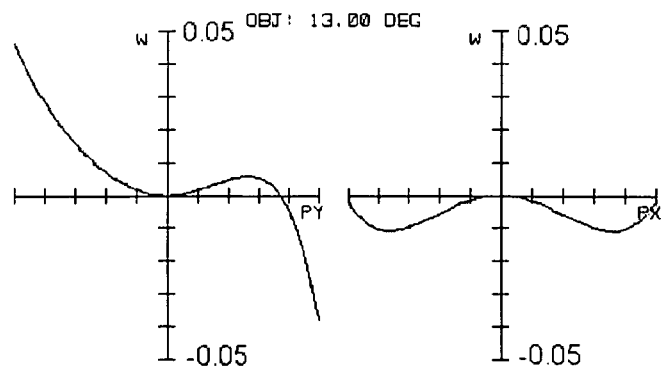

Referring to FIGS. 29-36, FIG. 29 and FIG. 33 are graphs respectively showing sine aberrations occurring in the positive optical path and the reverse optical path. FIGS. 30-32 are graphs respectively showing optical path differences occurring in the positive optical path. FIGS. 24-36 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 40 along the optical axis direction thereof satisfy the sine condition; and that optical path differences occurring in both the positive optical path and reverse optical path are very small under conditions (1)~(6), such that the Fourier transform lens system 40 achieves diffractive-limit. Accordingly, the positive optical path lens arrangement of the Fourier transform lens system 40 has a relatively large aperture and a small field of view, and the reverse optical path lens arrangement of the Fourier transform lens system 40 has a small aperture and a medium field of view. Thereby, the Fourier transform lens system 40 is advantageously suitable for use in a holographic storage system where a signal beam and a reference beam co-propagate along a common optical axis.

Table 5 below lists relative parameters of optical properties of each of the four above-described embodiments of the Fourier transform lens system.

TABLE 5

| | | Embodiment | | | |
|---|---|---|---|---|---|
| | | 1 | 2 | 3 | 4 |
| f (mm) | | 33 | 30 | 44 | 40 |
| Positive optical path for object region | F/# | 1.7 | 1.67 | 2.2 | 2.25 |
| | 2ω(°) | 5.2 | 5.72 | 5.2 | 5.72 |
| Reverse optical path for object region | F/# | 11 | 10 | 11 | 10 |
| | 2ω(°) | 33.8 | 34 | 25.6 | 26 |
| Reference optical path | | Object space NA = 0.0875 | | Object height 17.5 mm | |
| $f_2/f$ | | 1.24 | 1.14 | 1.11 | 1.04 |
| $R_{12F}/f$ | | −1.19 | −1.09 | −0.90 | −0.94 |
| $R_{31F}/f$ | | 0.59 | 0.65 | 0.64 | 0.63 |
| $R_{32R}/f$ | | 0.50 | 0.50 | 0.52 | 0.51 |
| $n_{20}$ | | 1.76430945 | | | |
| $n_{20}-n_{12}$ | | 0.14786654 | | 0.24526780 | |

Figure 37A:
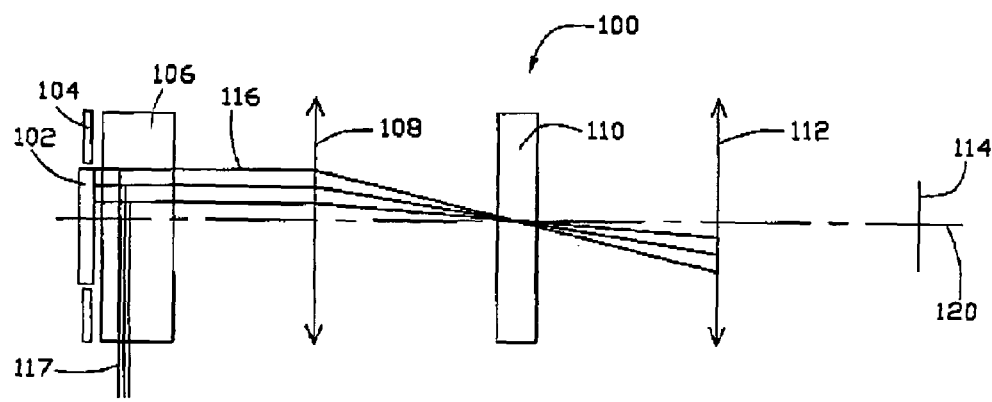
FIG. 37A is a schematic, cross-sectional view of a holographic storage system delivering a signal beam in accordance with a preferred embodiment.
Figure 37B:
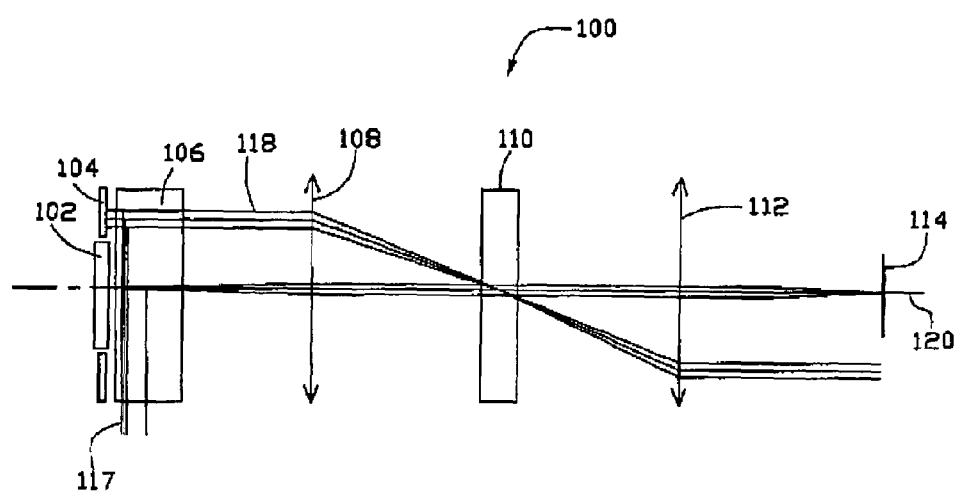
FIG. 37B is a schematic, cross-sectional view of the holographic storage system of FIG. 37A delivering a reference beam.

Referring to FIG. 37A and FIG. 37B, a holographic storage system 100 for data recording and retrieval where a signal beam and a reference beam co-propagate along a common optical axis is shown. The holographic storage system 100 includes a front group Fourier transform lens system 108 and a rear group Fourier transform lens system 112 arranged along a common optical axis 120. A holographic storage medium 110 in the form of a holographic disk, a holographic tape, or bulk holographic material (e.g., a crystal), etc, is disposed between the front group Fourier transform lens system 108 and the rear group Fourier transform lens system 112. Generally, the holographic storage medium 110 is placed in a rear focal plane (not shown) of the front group Fourier transform lens system 108 and a front focal plane (not shown) of the rear group Fourier transform lens system 112 at the same time. An object region for receiving an object generator 102 and a reference region for receiving a reference generator 104 are configured in the front focal plane (not shown) of the front group Fourier transform lens system 108. A beam splitter 106 is interposed between the object generator 102 and the front group Fourier transform lens system 108, for delivering a light beam 117 to the object generator 102 and reference generator 104. The object generator 102 is usually centered on the optical axis 120, and can be a spatial light modulator (SLM). The object generator 102 is configured for producing a signal beam 116 (see FIG. 37A) by setting its object pixels (not shown) to reflect or absorb the light beam 117. The reference generator 104 is disposed at a side of the object generator 102, and can be a light diffuser screen or plate. The reference generator 104 is configured for producing a reference beam 118 (see FIG. 37B) by reflecting the light beam 117. A sensor 114, e.g., a CCD (charge coupled device) or a CMOS (complementary metal-oxide semiconductor) active pixel array device, is usually placed in the rear focal plane (not shown) of the rear group Fourier transform lens system 112. The sensor 114 has a number of image pixels (not shown) corresponding to the object pixels. The sensor 114 is usually attached to a decoder (not shown), which is capable of decoding data received from the sensor 114.

During a data recording process, the signal beam 116 and reference beam 118 co-propagate along a direction of the common optical axis 120 through the front group Fourier transform lens system 108, and are incident on the holographic storage medium 110 to write a hologram therein.

During a data retrieval process, the sensor 114 detects a reconstructed signal beam produced by illuminating the hologram stored in the holographic storage medium 110 with the reference beam 118 and relayed by the rear group Fourier transform lens system 110. The reference beam 118 is relayed by the front group Fourier transform lens system 108.

Generally, the front group Fourier transform lens system 108 and the rear group Fourier transform lens system 112 have reverse lens arrangements. A focal length of the front group Fourier transform lens system 108 can be different from or the same as that of the rear group Fourier transform lens system 112, with the exact relationship usually being determined by the sizes of the object pixels and the image pixels. The front group Fourier transform lens system 108 can be the positive optical path lens arrangement of the Fourier transform lens system of the first embodiment, the second embodiment, the third embodiment, or the fourth embodiment as described above. The rear group Fourier transform lens system 112 can be the reverse optical path lens arrangement of the Fourier transform lens system of the first embodiment, the second embodiment, the third embodiment, or the fourth embodiment as described above. In one example, the front group Fourier transform lens system 108 is the positive optical path lens arrangement of the Fourier transform lens system 10 of the first embodiment, and the rear group Fourier transform lens system 112 is the reverse optical path lens arrangement of the Fourier transform lens system 20 of the second embodiment. In another example, the front group Fourier transform lens system 108 is the positive optical path lens arrangement of the Fourier transform lens system 30 of the third embodiment, and the rear group Fourier transform lens system 112 is the reverse optical path lens arrangement of the Fourier transform lens system 40 of the fourth embodiment.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A Fourier transform lens system, comprising:
a first lens group having positive power, wherein the first lens group comprises a first positive meniscus lens and a negative meniscus lens, and the first positive meniscus lens has a concave lens surface facing toward a concave lens surface of the negative meniscus lens;
a second lens group having positive power, wherein the second lens group comprises at least one bi-convex lens, and the negative meniscus lens of the first lens group is adjacent to the second lens group; and
a third lens group having negative power, wherein the third lens group comprises a second positive meniscus lens adjacent to the second lens group, and a bi-concave lens, the second positive meniscus lens has a convex lens surface facing toward the second lens group, and the first lens group, the second lens group, and the third lens group are arranged on a common optical axis of the Fourier transform lens system in that sequence; and wherein the Fourier transform lens system satisfies the following conditions (1)~(4):
(1) $0.8 < f_2/f < 1.4$,
(2) $-1.3 < R_{12F}/f < -0.7$,
(3) $0.35 < R_{31F}/f < 0.75$, and
(4) $0.3 < R_{32R}/f < 0.7$,
where, f is the total focal length of the Fourier transform lens system, $f_2$ is the focal length of the second lens group, $R_{12F}$ is the radius of curvature of the concave lens surface of the negative meniscus lens, $R_{31F}$ is the radius of curvature of the convex lens surface of the second positive meniscus lens, and $R_{32R}$ is the radius of curvature of a concave lens surface of the bi-concave lens which faces away from the second lens group.

2. The Fourier transform lens system of claim 1, wherein the Fourier transform lens system further satisfies the following conditions (5)~(6):
(5) $n_{20} > 1.7$, and
(6) $n_{20} - n_{12} > 0.15$,
where, $n_{20}$ is the refractive index of a material of the second lens group, and $n_{12}$ is the refractive index of a material of the negative meniscus lens.

3. The Fourier transform lens system of claim 1, wherein the second lens group comprises one bi-convex lens having positive power.

4. The Fourier transform lens system of claim 1, wherein the second lens group comprises two bi-convex lenses each having positive power.

5. A holographic storage system, comprising:
an object generator having object pixels configured for producing a signal beam,
a reference generator configured for producing a reference beam;
a storage medium positioned on an optical axis of the holographic storage system;
a sensor having image pixels corresponding to the object pixels;
a front group Fourier transform lens system configured for guiding the signal beam and the reference beam along the optical axis to the storage medium to write a hologram; and
a rear group Fourier transform lens system having a lens arrangement essentially reverse to that of the front group Fourier transform lens system configured for guiding a reconstructed signal beam produced by the hologram upon illumination with the reference beam to the sensor;
wherein each of the Fourier transform lens systems comprises:
a first lens group having positive power, wherein the first lens group comprises a first positive meniscus lens and a negative meniscus lens, and the first positive meniscus lens has a concave lens surface facing toward a concave lens surface of the negative meniscus lens;
a second lens group having positive power, wherein the second lens group comprises at least one bi-convex lens, and the negative meniscus lens of the first lens group is adjacent to the second lens group; and
a third lens group having negative power, wherein the third lens group comprises a second positive meniscus lens adjacent to the second lens group, and a bi-concave lens, the second positive meniscus lens has a convex lens surface facing toward the second lens group, and the first lens group, the second lens group, and the third lens group are arranged on the optical axis in that sequence; and wherein the front group and rear group Fourier transform lens systems satisfy the following conditions (1)~(4):

(1) $0.8 < f_2/f < 1.4$,
(2) $-1.3 < R_{12F}/f < -0.7$,
(3) $0.35 < R_{31F}/f < 0.75$, and
(4) $0.3 < R_{32R}/f < 0.7$, where, f is the total focal length of the front group Fourier transform lens system, $f_2$ is focal length of the second lens group, $R_{12F}$ is the radius of curvature of the concave lens surface of the negative meniscus lens, $R_{31F}$ is the radius of curvature of the convex lens surface of the second positive meniscus lens, and $R_{32R}$ is the radius of curvature of a concave lens surface of the bi-concave lens which faces away from the second lens group.

6. The holographic storage system of claim 5, wherein each of the Fourier transform lens systems further satisfies the following conditions (5)~(6):

(5) $n_{20} > 1.7$, and
(6) $n_{20} - n_{12} > 0.15$, where, $n_{20}$ is the refractive index of a material of the second lens group, and $n_{12}$ is the refractive index of a material of the negative meniscus lens.

7. The holographic storage system of claim 5, wherein the second lens group comprises one bi-convex lens having positive power.

8. The holographic storage system of claim 5, wherein the second lens group comprises two bi-convex lenses each having positive power.

9. The holographic storage system of claim 5, wherein the object generator and the reference generator are located in a common plane orthogonal to the optical axis.

10. The holographic storage system of claim 9, further comprising a beam splitter interposed between the common plane and the front group Fourier transform lens system.

11. The holographic storage system of claim 10, wherein the object generator is centered on the optical axis.

12. The holographic storage system of claim 5, wherein the object generator is a spatial light modulator.

13. The holographic storage system of claim 5, wherein the reference generator is a light diffuser.

14. The holographic storage system of claim 5, wherein the sensor is selected from the group of devices consisting of charge coupled devices, and complementary metal-oxide-semiconductor active pixel array devices.

15. The holographic storage system of claim 5, wherein the holographic storage medium is selected from the group consisting of a holographic disk, a holographic tape, and bulk holographic material.

16. A Fourier transform lens system assembly comprising:
an object generator having object pixels configured for producing a signal beam;
a reference generator configured for producing a reference beam;
a holographic storage medium positioned on an optical axis of the Fourier transform lens system assembly;
a sensor having image pixels corresponding to the object pixels; and
at least one Fourier transform lens system configured for guiding the signal and the reference beam along the optical axis to the holographic storage medium to write a hologram or for guiding a reconstructed signal beam generated by illuminating the holographic storage medium with the reference beam to the sensor;
wherein the at least one Fourier transform system comprises:
a first lens group having positive power, wherein the first lens group comprises a first positive meniscus lens and a negative meniscus lens, and the first positive meniscus lens has a concave lens surface facing toward a concave lens surface of the negative meniscus lens;
a second lens group having positive power, wherein the second lens group comprises at least one bi-convex lens, and the negative meniscus lens of the first lens group is adjacent to the second lens group; and
a third lens group having negative power, wherein the third lens group comprises a second positive meniscus lens adjacent to the second lens group and a bi-concave lens, the second positive meniscus lens has a convex lens surface facing toward the second lens group, and the first lens group, the second lens group, and the third lens group are arranged on the optical axis in that sequence;
and wherein the at least one Fourier transform lens system satisfies the following conditions (1)~(4):

(1) $0.8 < f_2/f < 1.4$,
(2) $-1.3 < R_{12F}/f < -0.7$,
(3) $0.35 < R_{31F}/f < 0.75$, and
(4) $0.3 < R_{32R}/f < 0.7$, where, f is the total focal length of the at least one Fourier transform lens system, $f_2$ is focal length of the second lens group, $R_{12F}$ is the radius of curvature of the concave lens surface of the negative meniscus lens, $R_{31F}$ is the radius of curvature of the convex lens surface of the second positive meniscus lens, and $R_{32R}$ is the radius of curvature of a concave lens surface of the bi-concave lens which faces away from the second lens group.

17. The Fourier transform lens system assembly of claim 16, wherein the at least one Fourier transform lens system further satisfies the following conditions (5)~(6):

(5) $n_{20} > 1.7$, and
(6) $n_{20} - n_{12} > 0.15$, where, $n_{20}$ is the refractive index of a material of the second lens group, and $n_{12}$ is the refractive index of a material of the negative meniscus lens.

18. The Fourier transform lens system assembly of claim 16, wherein the second lens group comprises one bi-convex lens having positive power.

19. The Fourier transform lens system assembly of claim 16, wherein the second lens group comprises two bi-convex lenses each having positive power.

* * * * *